Jan. 9, 1940. W. C. GROENIGER 2,186,755
VOLUMETRIC CONTROL MEANS FOR DEFECATOR FLUSH RIM WATER SUPPLY
Filed Feb. 15, 1938
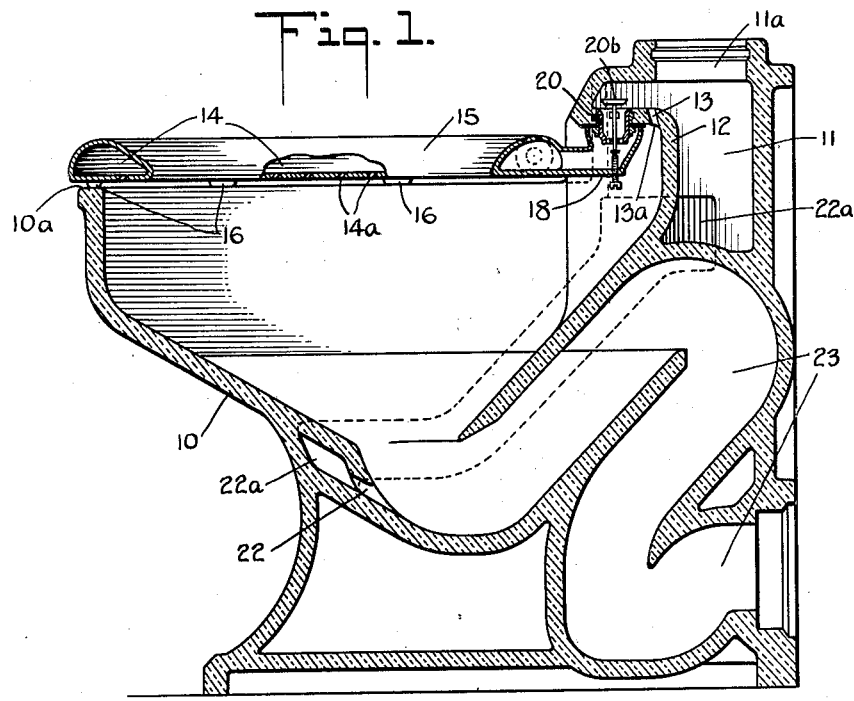
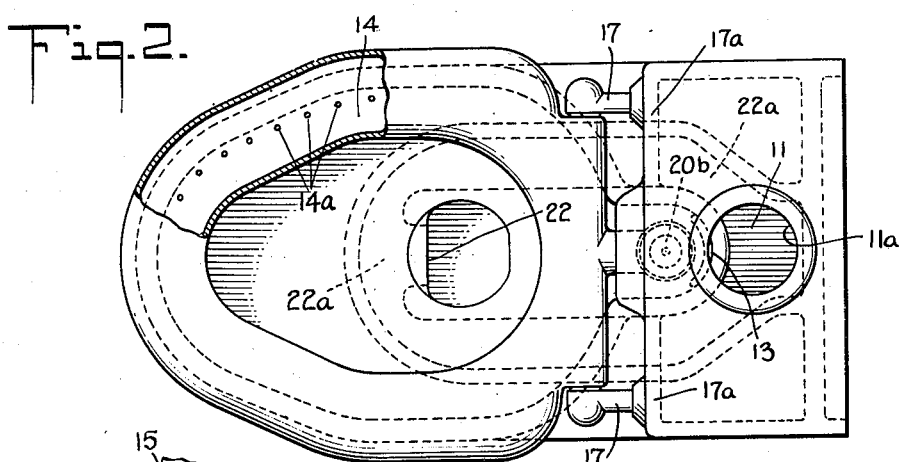
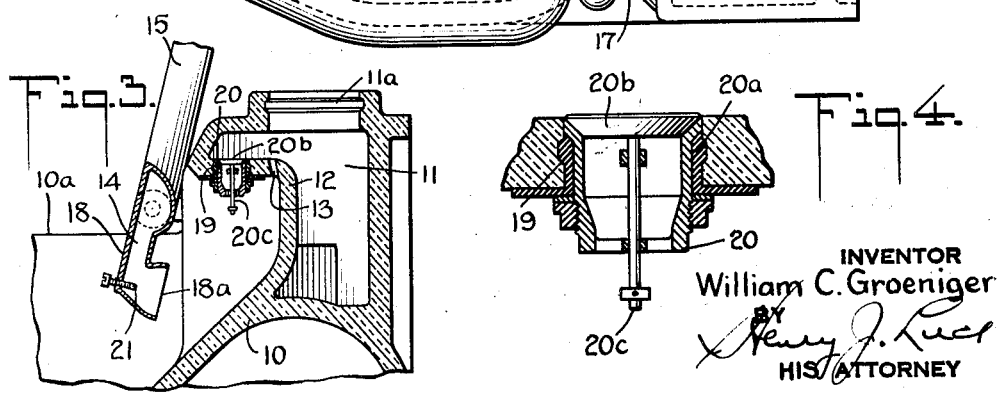
INVENTOR
William C. Groeniger
BY
HIS ATTORNEY Patented Jan. 9, 1940

2,186,755

UNITED STATES PATENT OFFICE 2,186,755

VOLUMETRIC CONTROL MEANS FOR DEFECATOR FLUSH RIM WATER SUPPLY

William C. Groeniger, Columbus, Ohio, assignor to John B. Pierce Foundation, New York, N. Y., a corporation of New York Application February 15, 1938, Serial No. 190,576

8 Claims. (Cl. 4—10)

This invention relates to improvements in water closet bowls, defecators and the like, and particularly to water closet bowls or other receptacles in which water, in volume and/or pressure is the energy used to flush, siphon, wash and/or evacuate wastes out of a water closet bowl into the soil pipe, and the water is supplied from a flush rim disposed above and over the top of the rim of the receptacle. The present invention particularly sets forth means for effecting positive volumetric control of such discharge of water from the flush rim.

The invention is applicable to all types of water closet bowl structures and to any desired arrangement of water supply inlet. Preferably, such water closet bowls or defecators have integral air entry ports communicating directly with a water supply channel or equivalent of the bowl, a wall, serving in common as a portion of the bowl proper and of the water supply channel being provided with air entry means leading to the interior of the bowl and positioned appreciably above the overflow spill level of the closet bowl, that is, above the maximum level at which overflow from the bowl may take place. Such air entry means provide an at all times free and unobstructed passage through which atmospheric air may enter the water supply channel, and function under all possible status of normal or abnormal conditions of operation, including vacuum condition in the supply channel piping or water supply distributing system, to admit air thereto in dissipation of such vacuum.

The flush rim may be mechanically independent of the closet bowl per se and desirably is mechanically directly associated with the seat. Preferably, the flush rim and seat are mechanically formed as a unit.

In such combined seat-flush-rim structure, means may be provided for locating the rim jet openings, when the combined seat-flush rim structure is in its lowered position, at a clearance appreciably above the overflow spill level of the closet bowl, thus affording air entry openings functioning additively to the first-mentioned air entry means in precluding syphonage of the contents of the bowl into the water supply distributing system of the building in which the defecator is located, under condition of vacuum in the water supply distributing system.

In preferred embodiments of my invention, flow of water or other suitable flushing liquid to the rim-flush channel is effected through an aperture communicating directly with the water supply channel, such aperture being arranged to discharge into a conduit leading to the rim-flush channel.

An object of the present invention is to provide means for volumetrically regulating the flow of water or other flushing liquid into the seat-flush-rim means for discharge therefrom, thereby affording means for achieving the desideratum of an operative balance of the rim-jet flushing and bowl flushing components of the closet-bowl flushing operation. Such volumetric control may be effected by a flow-regulating valve disposed at the stated point of connection of the water supply channel to the flush-rim feed conduit. Desirably, the valve is arranged to close, and thus preclude water discharge from the communicating aperture, when the seat is in raised position. Means are provided to establish the "open" position of the valve means, to effect the above stated volumetric regulation of discharge from the rim jet openings.

Most desirably, the valve is of "poppet" type, having substantial valve-disc area, and freely vertically slidable in suitable guideways. Such valve, when applied to the present invention, has the inherent advantage of opening, in the circumstance of suitable sub-atmospheric pressure condition in the water supply chamber, by the imposition of atmospheric pressure to the underside of its valve disc.

As above generally set forth, the opening in the wall of the bowl-water supply channel and disposed appreciably above the overflow spill level of the bowl, functions to discharge the flushing water into the bowl; preferably, such opening is arranged and constructed to scour the rear inner faces of the bowl. Such opening, accordingly, is located at a position intermediate the flush-rim conduit supply, thus constituting a dual air entry arrangement of great total cross-sectional area, effecting complete and immediate dissipation of any condition of vacuum in the water distribution system.

The above objectives and additional advantages are attained in preferred embodiments of the present invention by extending upwardly the rear wall structure of the bowl and locating therein the stated air entry opening, thus locating the same a marked clearance above the overflow spill level of the bowl. Advantageously, in such preferred embodiments, the aperture effecting communication between the water supply channel and the combined seat-flush-rim structure is similarly located at an elevation above the upper rim of the bowl proper, thus providing for definite downgrade flow and consequent increased efficiency, of the flushing water in its path of flow to and through the flush rim of the combined seat-flush-rim structure.

Further features and objects of the invention will be more fully understood from the following detail description and the accompanying drawing, in which Fig. 1 is a vertical section of a closet bowl typical of a general form of closet bowl, provided with cross connection preventing means and equipped with combined seat means and rim flush means and therewith associated volumetric control valve, pursuant to the invention;

Fig. 2 is a top plan view of Fig. 1, partly broken away through its rim flush means, in horizontal section;

Fig. 3 is a detail vertical section corresponding to a portion of Fig. 1, on a somewhat reduced scale, showing the combined seat and rim flush means moved to raised position and the resultant closure of the rim flush supply and control valve; and Fig. 4 is a detail vertical section illustrating a manner of aperture affording communication between the water supply channel and the interior of the rim flush means, equipped with a preferred form of rim flush supply and control valve.

Referring to the drawing, the bowl 10 of the defecator or water closet may be of any desired form of construction providing for the requisite water seal and arranged for any desired manner of discharge. By any form of construction, I include closet bowls of the conventional syphon wash-down type, syphon jet type, blow-out, i. e., ejector type, combined bowl and tank type, hopper type, or of the momentum jet type, the last named usually including a vortical jet opening.

Mechanically directly associated with such bowl 10, pursuant to the present invention, is provided a water supply channel 11 having an intake opening 11a, suitably arranged for connection with the water supply distributing system of the building in which the defecator is located, through the agency of a flush tank, piping equipped with a flushometer valve, etc., as preferred. As illustrated in the drawing, the water supply channel is formed integral with the structure of the bowl proper 10.

As shown, the wall 12 serving in common as a wall of the water supply channel 11 and an upper wall portion of the bowl proper 10, is equipped with an opening 13 communicating at its upper end with the interior of the channel 11 and having its lower end 13a disposed in proximity of the inner face of the bowl proper, and preferably constructed to direct one or more jets in scouring relation with such inner face of the bowl proper.

A structural and functional feature of the present invention resides in disposing the lower end 13a of such opening 13 at a clearance vertically above the overflow spill level of the closet bowl, for the purposes herein set forth.

Pursuant to the invention, suitable seat means and therewith mechanically associated flush rim means are provided, and suitably mounted to afford proper support for the same when the flush rim means is in position adjacent the upper rim of the closet bowl proper, under condition of flushing, to effect thorough scouring of the inner walls of the bowl proper.

In the embodiment illustrated in the drawing, the seat means and therewith mechanically associated flush rim means are structurally unitarily combined, in that such unitary structure is of hollow formation, the interior 14 of which serves as a flush rim channel and the upper wall portion 15 of such hollow formation is suitably contoured to serve as the seat. The rim jet openings are indicated at 14a.

A feature of the present invention lies in the provision of means for insuring an effective clearance between the rim jet openings 14a when the combined seat and flush rim means are in lowered position and at a clearance vertically appreciably above the overflow spill level of the closet bowl. As illustrated in the drawing, such provision of means is had by suitable bumper means, advantageously a set of bumpers 16 carried at the under wall face of the combined seat-flush rim means, arranged to engage the upper rim of the bowl when the combined seat-flush rim means are in lowered position.

Suitable communication affording means is provided between the interior of the water supply channel 11 and the interior 14 serving as the flush rim channel, during the stage of flushing, when the combined seat-flush rim means is in lowered position. Such desideratum is attained pursuant to the embodiment illustrated in the drawing by pivotal mounting of the combined seat-flush rim means as by seat posts 17, 17, suitably secured to the structure of the bowl such as to the indicated wall portion 17a, and by a conduit 18 suitably communicating with the flush-rim channel 14 as by integral wall connection therewith, the opening 18a of such conduit making effective communication with the interior of the water supply channel 11 when the combined seat-flush-rim means is in its lowered position. As shown, such communication is had by the provision of an aperture 19 in a wall of the water supply channel, such aperture being desirably equipped with suitable valve means 20 arranged to assume open position when the combined seat-flush-rim means is in lowered position, and to be closed on movement of the combined seat-flush-rim means to its raised position. Such objectives are attained by the aperture and valve means illustrated in the drawing, namely a hollow valve body 20a suitably positioned with indicated packing in liquid seal relation with the walls of the aperture 19, a valve disc member 20b, freely vertically and rotatably movable within valve body 20a, and arranged to assume a closed position preferably under gravitational pull. Such valve disc member 20b may be suitably operated, as by means of its stem 20c, to assume an open position automatically when the combined seat-flush-rim means is moved to its lowered position, as by mechanical engagement of the free end of such valve stem 20c with a set screw 21 adjustably carried by the conduit 18.

The degree of opening of the valve member 20b when the seat is in its lowered position may definitely be determined and established by the suitable adjustment of the set screw 21. Such positive control of valve opening achieves a primary object of the present invention, namely, the attainment of an operative balance between the rim-flush and the bowl-flush components of the complete bowl-flushing operation.

Accordingly under the condition of supply of water to the water supply channel 11, assuming the combined seat-flush-rim means 14, 15, to be in lowered position, such flushing water is in part directed to the particular jet or jets or equivalent, such as the jet 22 supplied through the channel 22a leading from the water supply channel 11, to effect the desired manner of discharge of the contents of the bowl as through the discharge passage 23, and in part directed dually through the one or more jet wall scouring openings 13 and through the aperture 19—the movable valve 20b being lifted to its raised, i. e., open, position— and thence through the conduit 18 and the hollow interior 14 of the combined seat-flush-rim means, and finally through the rim jet openings 14a, such last-mentioned discharge, through the agency of the valve 20, being always uniform, and under full volumetric control.

Succeeding such flushing stage, assuming the combined seat-flush-rim means to be raised to its Fig. 3 position, any residue of the flushing water remaining in the flush rim 14 drains out under gravity through the now-free opening 18a.

In the event that the combined seat-flush-rim means is in partial or full raised position, in which circumstance the movable valve member 20b moves by gravity into closed position, should the flush tank, flushometer or the like be operated, such flushing water is precluded from passage through the aperture 19 and is discharged from the water supply channel 11 partly through the jet-discharging means 22, or equivalent, and jointly through the one or more jet openings 13, the aforesaid taking place to the exclusion of the supply of water to the interior 14 of the combined seat-flush-rim means.

In the circumstance of a vacuum or other abnormal condition in the water supply distribution system supplying the flushing water, any syphonage of the contents of the bowl into the water supply distribution system is positively precluded by the one or more jet openings 13, the cross-sectional area thereof being designed to exceed the cross-sectional area of the piping leading to the flush-tank or the piping equipped with a flushometer valve or equivalent effecting the supply of the flushing water. Such dissipation of any such vacuum condition takes place, it will be noted, independently of the position of the movable valve member 20b. Should the combined seat-flush-rim means be in its lowered position, thus causing the movable valve member 20b to be raised to its open position, the open status of the aperture 19 functions to add the total cross-sectional areas of the flush rim openings 14a in assistance to that of the opening or openings 13, in the dissipation of such vacuum condition.

Desirably, the stated valve member 20b and its combined seat and guide structure 20a are of Monel metal, stainless steel, brass or like materials offering resistance to the corrosive effects of water or acidulated water. Such valve member 20b is therefore at all times freely movable by gravity into valve-closing position, on raising the seat, and, additionally and importantly, may be elevated from the valve seat, in the circumstance of sufficiently high vacuum in the channel 11, by the pressure of the atmosphere on the underside of such valve member 20b. The opening of such valve member functions additively to the opening or openings 13 to admit atmospheric air to dispel any vacuum in chamber 11 and thus prevent syphonage of the contents of the bowl into the water supply distribution system.

From the above, it appears that the invention embodies dually operative provision of means for the entry of air under all status of operation of the bowl, in dissipation of any vacuum and/or in the circumstance of other abnormal conditions affecting the bowl and/or the supply of flushing water thereto.

As appears from the preferred embodiment of the invention illustrated in the drawing, the objectives of the invention are attained by extending the wall and other rearward portions of the bowl definitely upwardly above the top rim of the bowl proper, thus locating the air entry opening 13 and the opening of valve body 20, at marked clearance above the overflow spill level of the bowl. Such provision of means additionally affords a definite downgrade path of flow of the flushing water from the water supply channel to and through the flush rim, thus enhancing the efficiency of flushing operation.

Whereas this invention has been illustrated and described with respect to a preferred embodiment thereof, it is clearly understood that changes may be made without departing from the spirit of the invention as defined in the following claims.

I claim:

1. The combination with a closet bowl, of seat means and therewith associated rim flush means, means for movably mounting said seat means and said rim flush means in common relative to the closet bowl to afford movement of the same from bowl-rim supported status to a position remote therefrom, and means affording communication between the interior of said rim flush means and said channel when said seat means and rim flush means are in bowl-rim supported position, said communication affording means comprising an aperture communicating with said channel and including valve means operatively associated with said seat for controlling water flow into said rim flush means.

2. The combination of a closet bowl, including a water supply channel unitarily constructed therewith, a wall in common with the said channel and the bowl proper being provided with an opening affording communication between said channel and the interior of the bowl at a locality in proximity of an inner face of the bowl proper, of seat means and unitarily associated therewith rim flush means, means for movably mounting said seat means and said rim flush means in common relative to the closet bowl to afford movement of the same from a position remote therefrom, means for limiting the movement of said rim flush means when in position adjacent the upper rim of the closet bowl to provide an air gap between the rim flush openings of the rim flush means above the overflow spill level of the closet bowl, and means affording communication between the interior of said rim flush means and said channel when said seat means and rim flush means are in position adjacent the upper rim of the closet bowl, said communication affording means comprising an aperture communicating with said channel, and poppet valve means for controlling water flow through said communicating aperture.

3. The combination with a closet bowl, of seat means and therewith associated rim flush means, means for movably mounting said seat means and said rim flush means in common relative to the closet bowl to afford movement of the same from a position adjacent said bowl rim to a position remote therefrom, and means affording communication between the interior of said rim flush means and said channel when said seat means and rim flush means are in position adjacent the upper rim of the closet bowl, said communication affording means comprising an aperture communicating with said channel, freely slidable valve means operatively associated with said rim flush means for controlling said communicating aperture, and means associated with said rim flush means for establishing the degree of opening of said valve means.

4. The combination of a closet bowl, including a water supply channel unitarily constructed therewith, a wall in common with said channel and the bowl proper being provided with an opening affording communication between said channel and the interior of the bowl at a locality in proximity of an inner face of the bowl proper, of seat means and unitarily associated therewith rim flush means, means for movably mounting said seat means and said rim flush means in common relative to the closet bowl to afford movement of the same from a position remote therefrom, means for limiting the movement of said rim flush means when in position adjacent the upper rim of the closet bowl to provide an air gap between the rim flush openings of the rim flush means above the overflow spill level of the closet bowl, and means affording communication between the interior of said rim flush means and said channel when said seat means and rim flush means are in position adjacent the upper rim of the closet bowl, said communication affording means comprising an aperture communicating with said channel, and valve means freely movable independently of said rim flush means for controlling said aperture and responsive to effect its open position when said rim flush means is in position closely adjacent the upper rim of the closet bowl.

5. The combination of a closet bowl, including a water supply channel unitarily constructed therewith, a wall in common with said channel and the bowl proper being provided with an opening affording communication between the said channel and the interior of the bowl at a locality in proximity of an inner face of the bowl proper, of seat means, rim flush means carried by said seat means, means affording common movement of said seat means and said rim flush means from a position adjacent the upper rim of the closet bowl to a position remote therefrom, means for limiting the common movement of said means and said rim flush means when in position adjacent the upper rim of the closet bowl to provide an air gap between the rim flush openings of said rim flush means above the overflow spill level of the closet bowl, and means affording communication between the interior of said rim flush means and said channel when said seat means and said rim flush means are in position adjacent the upper rim of the closet bowl, said last mentioned means including a port in said channel, a normally closed lift valve disposed therein, a conduit associated with said rim flush means and arranged to connect to said port when the seat is in lowered position, and means associated with said conduit to lift said valve into flow-permitting position when said seat is in lowered position.

6. The combination of a closet bowl, including a water supply channel unitarily constructed therewith, a wall in common with such water supply channel and the bowl proper being provided with an opening affording communication between said channel and the interior of the bowl at a locality in proximity of an inner face of the bowl proper, of seat means, rim flush means by said seat means, means affording common movement of said seat means and said rim flush means from a position adjacent the upper rim of the closet bowl to a position remote therefrom, means for limiting the common movement of said seat means and said rim flush means when in position adjacent the upper rim of the closet bowl to provide an air gap between the rim flush openings of said rim flush means above the overflow spill level of the closet bowl, and means affording communication between the interior of said rim flush means and said water supply channel when said seat means and said rim flush means are in position adjacent the upper rim of the closet bowl, said last named means including an aperture in a wall of said water supply channel and a normally closed lift valve controlling flow through said aperture, and means for establishing desired degrees of lift of said valve when the seat means is in bowl supported position.

7. In a defecator, the combination with a bowl and water supply means therefor, of flush means disposed above the maximum level of overflow of said bowl, said flush means comprising a movable water-flow channel arranged to communicate with said water supply means under predetermined positions of such flow-channel and slide-valve means operatively associated with said water-flow channel arranged to permit water flow into said water-flow channel in coincidence with the said predetermined positions, said valve means being adjustable to provide for desired volume of flow into said channel.

8. In a defecator having a bowl, water supply means for flushing said bowl, rim-flush means for said bowl, and conduit means displaceably mounted with respect to said bowl and affording water-flow communication of said rim-flush means with said water supply means, the combination with valve means in said water supply means, of adjustable means operatively associated with said rim-flush conduit means and said valve means for actuating said valve means upon displacement of said rim-flush conduit means with respect to said bowl.

WILLIAM C. GROENIGER.

CERTIFICATE OF CORRECTION.

Patent No. 2,186,755.  January 9, 1940.

WILLIAM C. GROENIGER.

It is hereby certified that error appears in the printed specification of the above numbered patent requiring correction as follows: Page 4, second column, line 13, claim 6, for "means by" read means carried by; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.